United States Patent [19]

Drapkin

[11] 4,053,715

[45] Oct. 11, 1977

[54] STUFFING CHANNEL UNIT FOR TELEPHONE PCM SYSTEM

[75] Inventor: Paul E. Drapkin, Palo Alto, Calif.

[73] Assignee: TRW Inc., Los Angeles, Calif.

[21] Appl. No.: 669,398

[22] Filed: Mar. 22, 1976

[51] Int. Cl.² .............................................. H04J 3/06
[52] U.S. Cl. ............................ 179/15 AF; 179/15 BY
[58] Field of Search .......... 179/15 AF, 15 BY, 15 BS

[56] References Cited

U.S. PATENT DOCUMENTS

| 3,575,557 | 4/1971 | McCowen | 179/15 AF |
| 3,821,478 | 6/1974 | Hillman | 179/15 AF |
| 3,840,705 | 10/1974 | Haskett | 179/15 AF |
| 3,886,317 | 5/1975 | Drapkin | 179/15 BY |

Primary Examiner—David L. Stewart
Attorney, Agent, or Firm—Flehr, Hohbach, Test, Albritton & Herbert

[57] ABSTRACT

A stuff system for converting a 50 KBS pulse train to standard 64 KBS provides a 3 bit 101 and 5 bit 01001 control bit stuffing code which tolerates both single and double errors without producing an out-of-frame condition.

10 Claims, 19 Drawing Figures

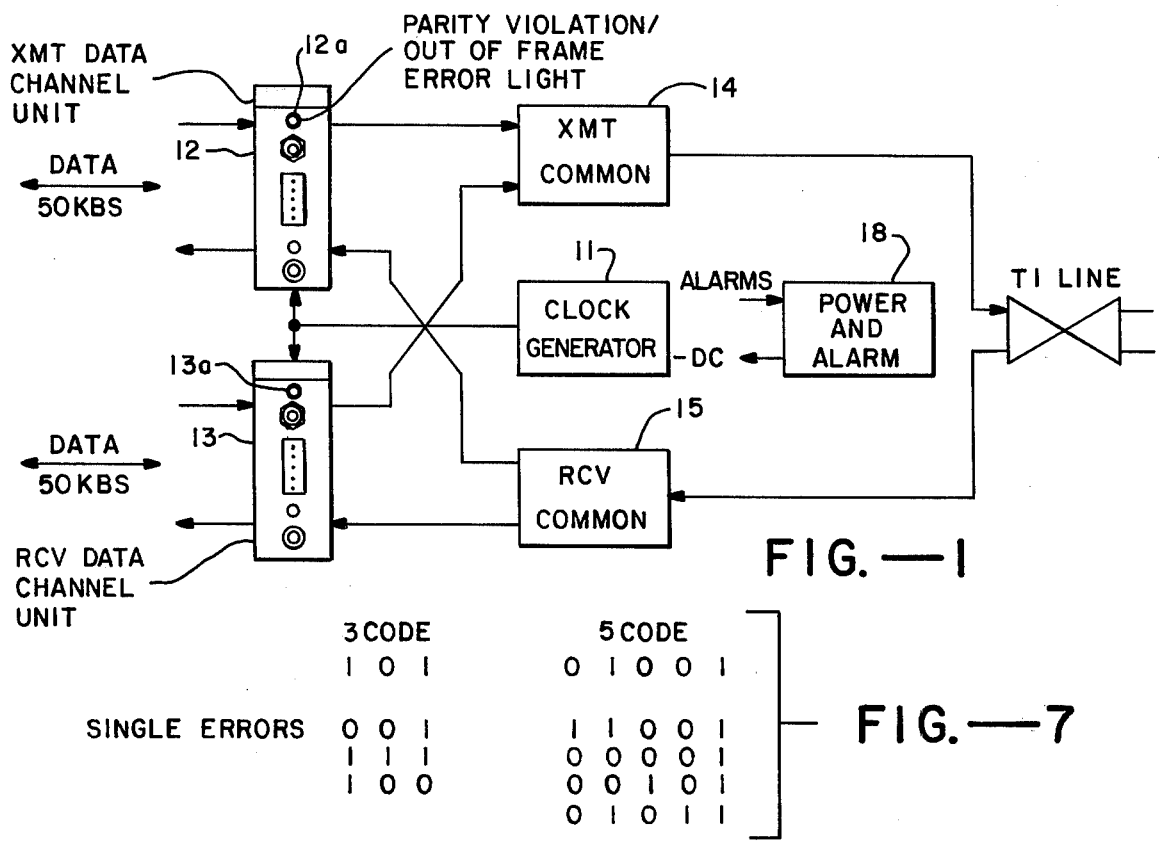

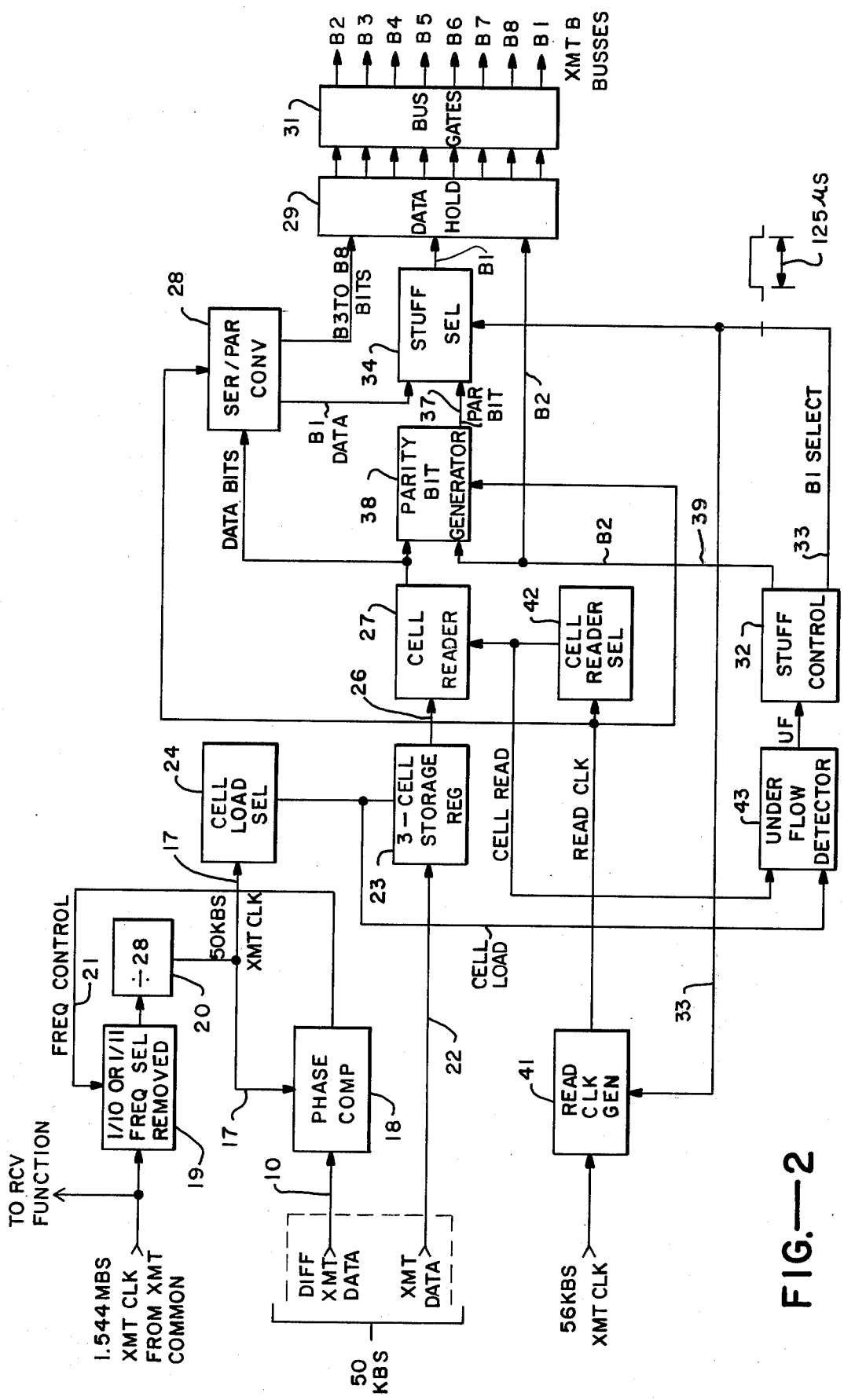
FIG.—2

FIG.—3
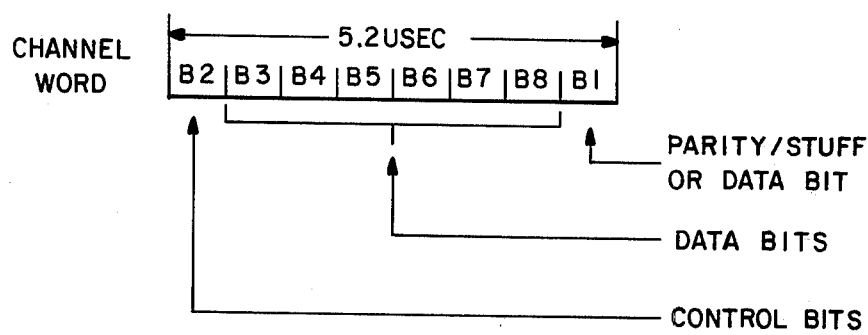
P = PARITY/STUFF BIT
D = DATA BIT
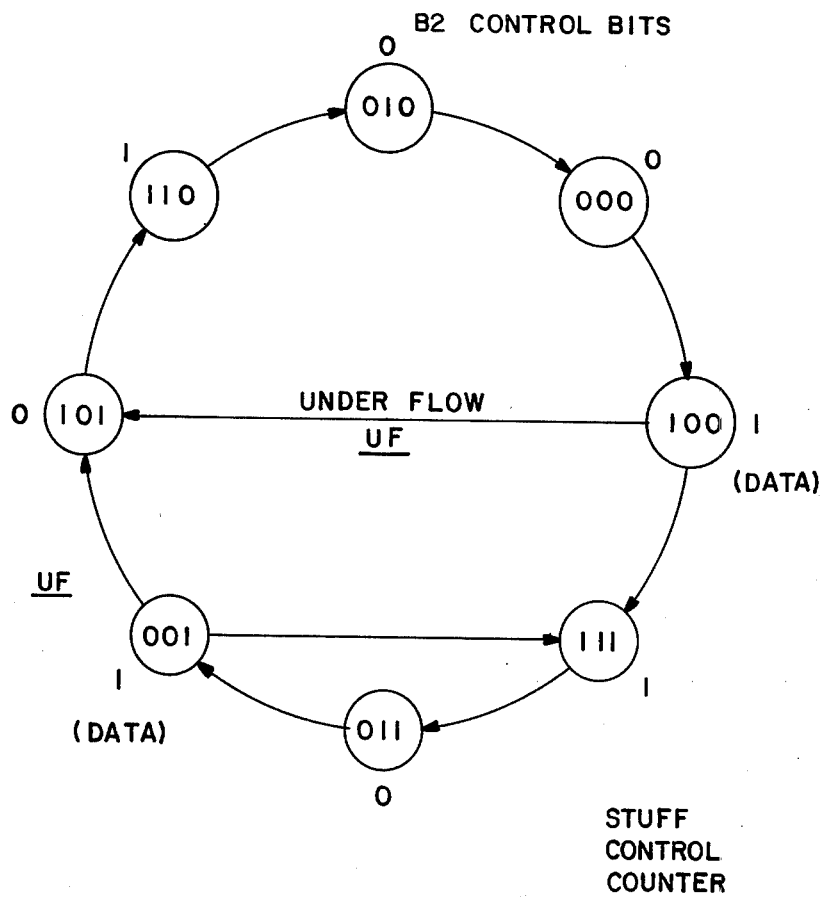
FIG.—4

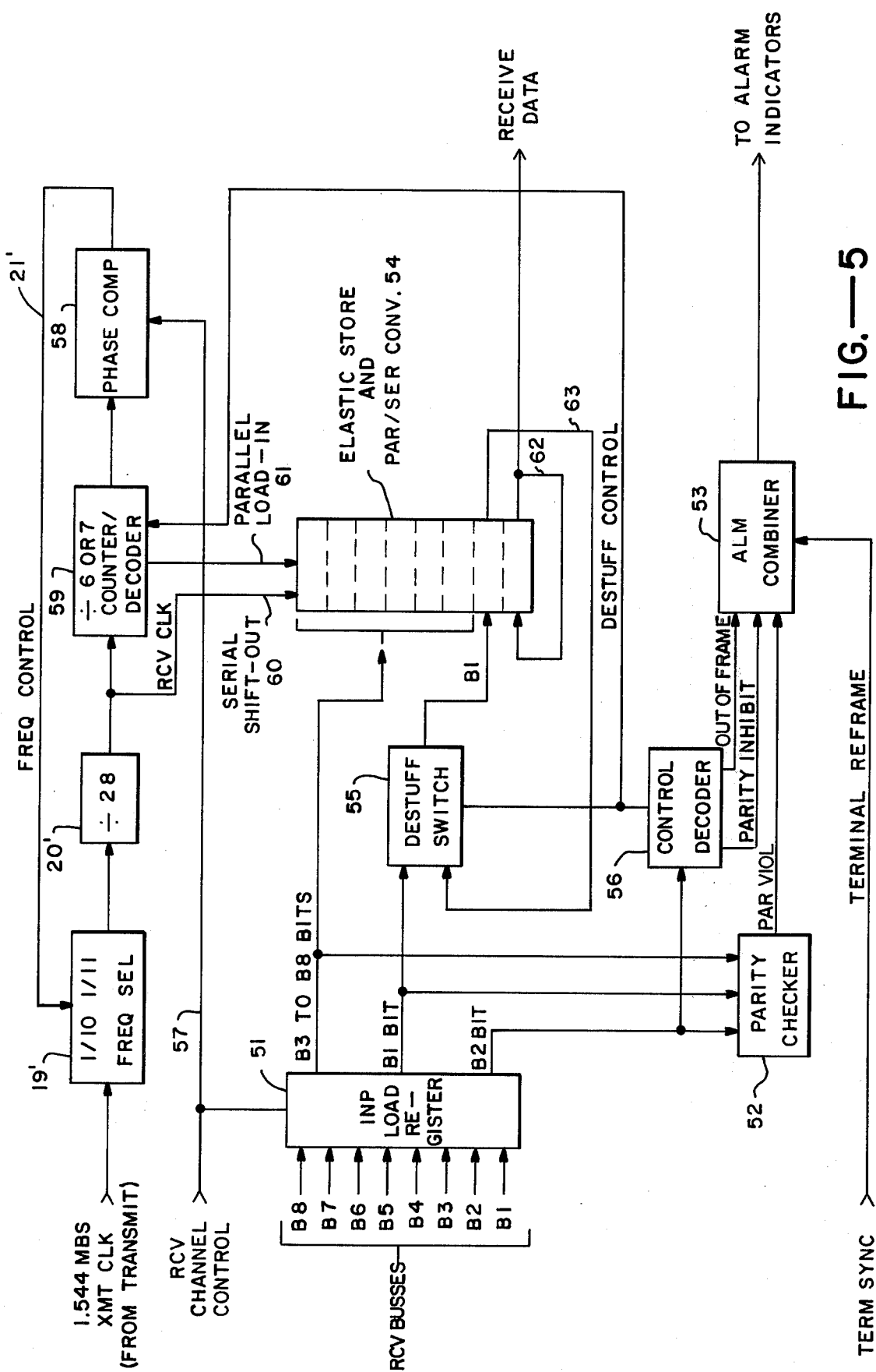
FIG.—5

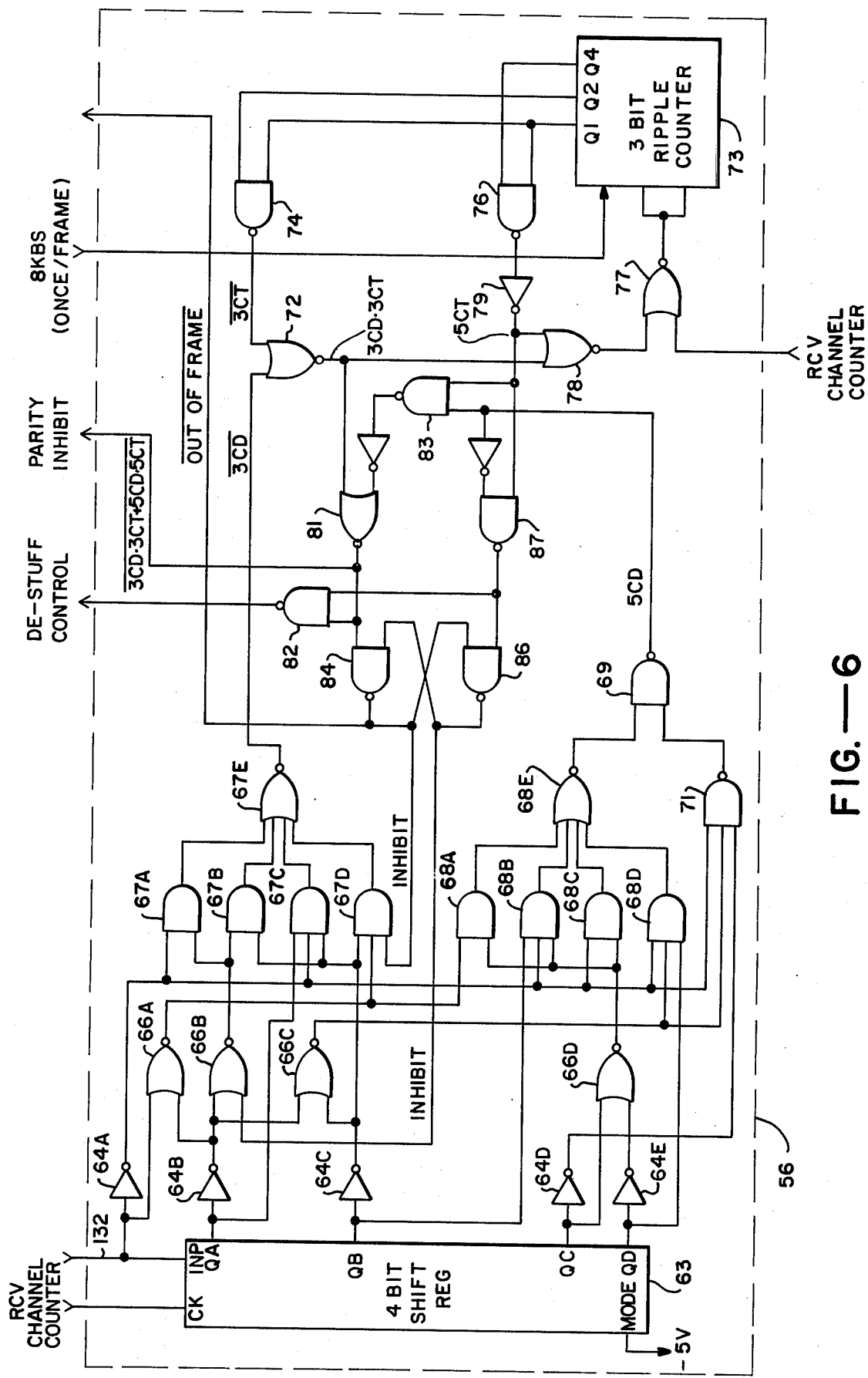
FIG.—6

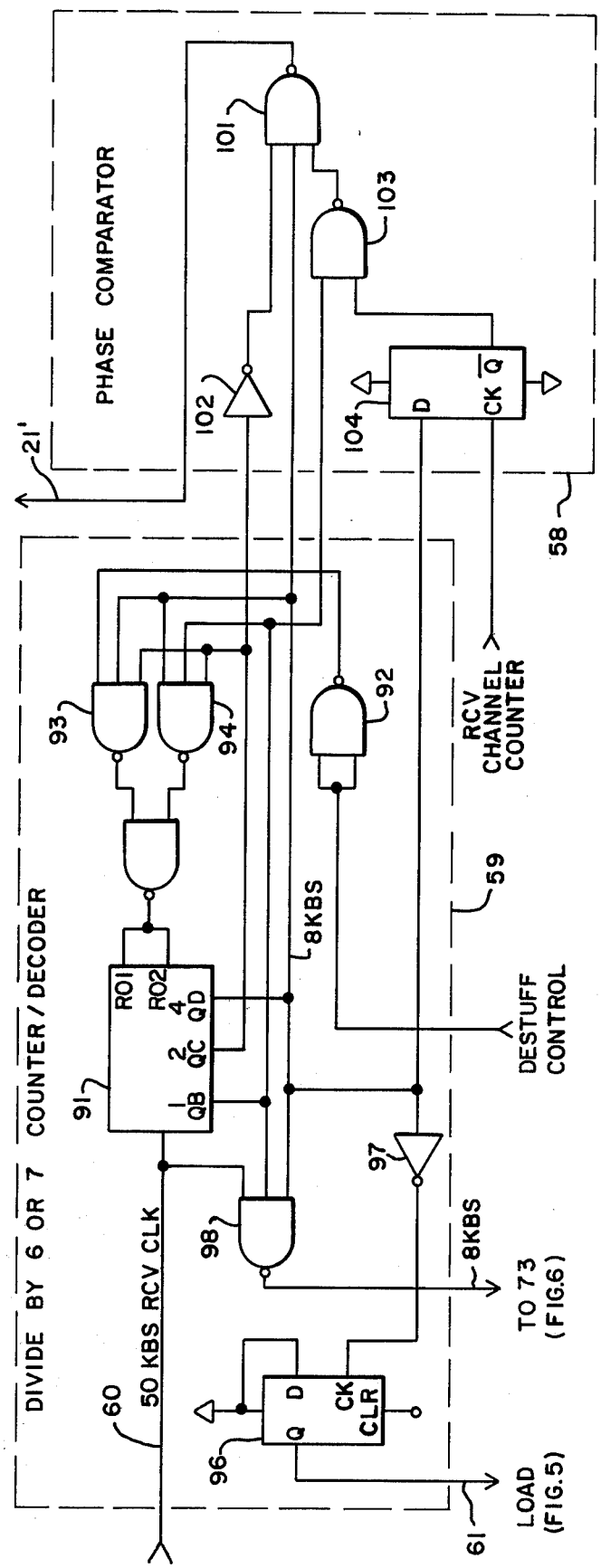
FIG.—9
FIG.—10

STUFFING CHANNEL UNIT FOR TELEPHONE PCM SYSTEM

BACKGROUND OF THE INVENTION

The present invention is directed to a time division transmission system for an asychronous pulse train having means for converting the pulse repetition rate (PRR) of the pulse train to a higher PRR by the insertion of stuff pulses. This, for example, allows a 50 kilobit per second asychronous pulse train to be synchronized with a standard 64 kilobit per second frequency of a standard time divided transmission facility such as the Bell Telephone System's T1 carrier system.

One technique for converting a 50 kilobit per second (KBS) data stream incoming over a user's line to a standard 64 kilobit per second data steam is shown in U.S. Pat. No. 3,136,861 in the name of J. S. Mayo and assigned to Bell Telephone Laboratories. This patent discloses a stuffing system and a predictive technique which is employed to remove inserted signals even in the presence of large transmission error rates. However, there is still a need for a relatively simple system which maintains synchronization and at the same time is highly resistant to errors in order not to create an out-of-frame condition all of the foregoing being done with a fairly simple coding concept.

OBJECTS AND SUMMARY OF THE INVENTION

It is, therefore, a general object of the present invention to provide an improved synchronous channel for an asychronous pulse train which is simple in concept but yet highly resistant to errors caused by noise.

In accordance with the above object there is provided a time division transmission system for an asychronous pulse train having means for converting the pulse repetition rate (PRR) of the pulse train to a higher PRR by the insertion of stuff pulses. The resultant pulse train has a PRR which is synchronous with a predetermined and fixed frequency of a common time-divided transmission facility. The resultant pulse train has a channel word with data bits and a control bit with a predetermined plurality of channels constituting a frame. The system comprises means for inserting stuff pulses in the pulse train in one of the channel words in accordance with a sequential control bit code having long and short portions where the long portion provides a lower stuffing rate corresponding to a PRR less than the PRR of the asychronous pulse train and the short portion provides a higher stuffing rate corresponding to a PRR greater than the pulse train. The system also includes receiving means responsive to the control bit code for removing the stuff pulses from the resultant pulse train.

BRIEF DESCRIPTION OF THE DRAWINGS

FIG. 1 is a block diagram of a data transmission system embodying the present invention;

FIG. 2 is a detailed block diagram of a transmit data channel portion of FIG. 1;

FIGS. 3A through 3C are channel word and control bit sequence diagrams useful in understanding the invention;

FIG. 4 illustrates the possible states of a counter utilized in a stuff control unit of FIG. 2;

FIG. 5 is a detailed block diagram of a receive data channel unit of FIG. 1;

FIG. 6 illustrates the logic of a control decoder portion of FIG. 5;

FIG. 7 is a table illustrating the single error immunity of the invention and is useful in understanding FIG. 6;

FIGS. 8A through 8H illustrate the double error immunity of the present invention;

FIG. 9 illustrates in detail two logic blocks of FIG. 5; and

FIG. 10 is a timing diagram useful in understanding FIG. 9.

DETAILED DESCRIPTION OF THE PREFERRED EMBODIMENT

FIG. 1 is a system block diagram incorporating the present invention. In general, FIG. 1 is a portion of a sub-mutiplexed T carrier system and more specifically a single channel and the common equipment equipped for both transmit and receive to a T1 line. As will be discussed in detail below the 50 KBS input is raised to 64 KBS (a predetermined and fixed frequency of the T carrier system) by adding extra bits in a technique known as pulse stuffing. Fifty-six KBS pulses are obtained from a clock generator unit 11 which is generated from the basic frequency of the T1 carrier system which is 1.544 MBPS. The transmit portion 12 of the transmit data channel and the receive portion 13 of the receive data channel process the data terminal's 50 KBS data to convert it to 56 KBS and adds a 8 KBS control bit code for a 64 KBS rate. Such data is synchronously transmitted over the T1 line at that rate. When received such data is reconverted to a 50 KBS pulse repetition rate. In a typical T1 carrier system there are, of course, 24 channels, only one of which is represented in FIG. 1. The other channel units may be voice, telegraph or data. All of the channel units interface with the transmit common unit 14, receive common unit 15 and power and alarm unit 16.

As will also be discussed below, both the transmit data channel unit 12 and receive unit 13 include parity violation/out-of-frame error lights 12a, 13a, respectively, which are illuminated whenever a parity error is detected or when synchronism is lost beyond a certain point as will be discussed below. When such out-of-frame condition does occur, the alarm is also given on a common alarm bus to the common T1 system.

The transmit data channel unit 12 is shown in greater detail in FIG. 2. The 50 KBS input data on line 10 to a pulse comparator 18 is actually processed by an interface unit (not shown) where it is differentiated in a manner well known in the art. A 50 KBS frequency is provided on a line 17 to the phase comparator 18 by use of a dividerunit 19 and a divide by 28 unit 20 which divides down the 1.544 MBS frequency of the T1 system. This 50 KBS clock frequency is phase locked to the differentiated data signal by a phase locked loop (PLL) which is completed by a frequency control line 21 from a phase comparator 18 to divider unit 19. When no input data is present on input line 10 the PLL provides a center frequency of 50,008 KBS. This is accomplished by unit 19 which operates on a cyclic basis divided into four quarters each of substantially 5 microsecond time duration. In the first two quarters 1 out of 11 pulses is removed; in the third quarter 1 out of 10; and in the fourth 1 out of 11. When 50 KBS data is present on line 10 the selective removal of pulses in the third and fourth quarters is adjusted between 1 out of 11 and 1 out of 10 by the action of the PLL in order to accurately track the frequency of the input data; e.g. 1/11 produces a higher frequency and 1/10 a lower.

The undifferentiated 50 KBS data is inputed on line 22 into a three cell elastic storage register 23. This is under control of the 50 KBS transmit clock on line 17 which by means of cell load select unit 24 loads the storage register 23. Thereafter, the data is gated into a serial to parallel converter 28 by a cell reader 27 which is connected to the three line output 26 of register 23. Serial to parallel converter 28 is connected to a data hold unit 29 which has parallel outputs connected to bus gates 31 to provide the standard B1 through B8 bits of a typical T1 carrier channel.

Referring briefly to FIG. 3A, a channel word which is 5.2 microseconds in length consists of eight bits with the B1 bit serving as a stuff or data bit, B3 through B8 always being data bits and B2 a control bit. In the context of the present invention when a stuff bit is inserted it is also used for purpose of parity checking. Since there are 24 channels plus a 0.648 microsecond framing bit a frame is a nominal 125 microseconds in length; i.e., 8 KBS. The 50 KBS data is pulse stuffed into 8-bit channel words occuring at the 8 KBS frame rate.

In accordance with the invention and as illustrated in FIGS. 3B and 3C, two control bit sequences are used to identify channel words where B1 is used for data and not for stuff or parity purposes. A three frame sequence of B2, 101, as illustrated in FIG. 3B indicates the first two B1 bits are parity/stuff bits and the third is data. The five frame sequence of FIG. 3B, 01001, indicates the initial four B1 bits are parity/stuff bits and the fifth bit is data. Normally, the two sequences are alternated to provide an unload rate low enough to prevent depletion of the storage register 23 and high enough to prevent overflow of the storage register; in other words, a bit rate of 50 KBS. However, depending on the input 50 KBS data rate a control code sequence of one type may be repeated as necessary. For example, the 101 B2 sequence transmits 6 bits of data for each of two frames and seven bits of data for the third frame which is an average rate of 50667 BPS. The 01001 B2 sequence has an average rate of 49,600 BPS.

Referring now again to FIG. 2, the control bit sequence of FIGS. 3B and 3C is generated by the stuff control unit 32 of FIG. 2. Specifically, unit 32 has a B1 select output line 33 which drives stuff select unit 34 to select between a B1 data bit on line 36 from converter 28 or a parity/stuff bit on line 37 from parity bit generator 38. The stuff control unit 32 also includes an output line 39 which provides the B2 control bit to the data hole unit 29.

Still referring to FIG. 2, the read clock generator 41 has an input timing pulse of 56 KBS which is obtained from the clock generator 11 illustrated in FIG. 1. If this were used to directly control the cell reader 27 and the elastic storage register 23, the register would be quickly depleted since its loading rate is only 50 KBS. Such a connection between the cell reader 27 and read clock generator 41 is provided by cell reader select unit 42. However, an underflow detector 43 monitors both the load and unload rates of elastic storage register 23 and when one bit remains in the register an underflow (UF) signal is forwarded to stuff control unit 32. Such underflow detector is well known in the art.

In operation the read clock generator 41 normally reads out seven bits during a frame of 125 microseconds (⅞ KBS). However, when it receives an inhibit signal on line 33 from stuff unit 32 only six bits is read out. Thus the inhibit signal on line 33 has an effective duration of one frame. Instead of B1 being a data bit this time it will be used as a parity/stuff bit which is generated by parity bit generator 38. The inhibit of data for B1 which provides the pulse stuffing discussed above occurs for nominally six out of eight words.

In accordance with well known T1 carrier technique a gas filling circuit is also utilized in conjunction with FIG. 2.

The actual B2 code which conveys frequency and word length information is generated by a stuff control counter in stuff control unit 32. The operation of this counter is shown in FIG. 4. The counter has eight possible states which are decoded to produce the B2 control bit indicated. The last bit of the each control code portion provides a B1 select indication on line 33 to cause the stuff select unit to select a data pulse rather than a stuff pulse. The underflow control line from underflow detector 43 controls the counter.

In operation if there is no underflow, the count sequence is 111, 011, 001, 111, etc. which provides the B2 code 101 repetitively. This is termed the 3CD. The corresponding B1 select during this continuous 3CD will be 001 where a "one" means B1 will be data and a "zero" B1 will be parity/stuff. During the frames that the B1 select is 0 or low a pulse is removed from the 56 KBS transmit clock, as discussed above, because the frame will consist of only six data bits. However, stuff select unit 34 is activated so that parity is sent out. During the third frame of the three code B1 select is high and in this case no pulse is removed from the 56 KBS transmit clock. Thus, the stuff select unit 34 now sends the seventh data bit instead of parity. If the underflow line is high, however, the count referring to FIG. 4, will continue around the circular loop to the five code sequence. This represents the lowest rate at which the elastic store register 23 can be emptied. Again when the B1 select goes high in the fifth frame of the five code as indicated the data bit will be provided in the seventh time slot.

Parity generator 38 generates the B1 parity bit so that there is always odd parity when B1 is not used as a data bit.

Receive Function

Now referring to FIG. 5 which is a block diagram of the receive channel unit 13, also illustrated in FIG. 1, the received data which occurs on eight receive data busses B1-B8 is stored an input load register 51 which serves the same function as the data hold unit 29 shown in FIG. 2. The loading of input register 51 is controlled by receive channel counter timing. All the bits are checked for proper parity (when B1 is a parity bit) by the parity checker 52 and any violation is registered in the alarm combiner unit 53. Data bits including the B1 parity/stuff bits are coupled to an elastic storage unit 54 which also performs parallel to serial conversion. The B1 parity/stuff bit is coupled to storage 54 through the destuff switch 55. The B2 control bit is sent to the control decoder unit 56 which monitors the sequence of the control bits sensing the code portions 101 or 01001 to operate destuff switch 55 to pass only B1 data bits.

Fifty KBS receive timing is generated in a manner similar to the 50 KBS transmit timing. However, the receive 50 KBS timing is phase locked to the incoming data bits to remove most of the stuffing phase jitter. This is done indirectly by using the receive channel counter input on line 57 which is synchronized to incoming T1 pulses in the receive common unit 15 illustrated in FIG. 1. The receive channel counter pulses on line 57 are compared in a phase comparator 58 to an 8 KBS signal (this is the framing rate) derived from the 50 KBS receive clock on line 60 and a frequency control signal is generated on line 21'.

More specifically, the frequency select unit 19' and divide by 28 unit 20' operate in the same manner as units 19 and 20 of FIG. 2 and are controlled by frequency control feedback from phase comparator 58. The resultant phase locked loop produces the 50 KBS receive clock on line 60 which also serves as a serial shift input to elastic storage unit 54. A divide by six or seven counter decoder unit 59 by means of a destuff control input from control decoder 56 provides an appropriate parallel load timing pulse on line 61.

In general when the control decoder 56 fails to recognize either of the two control bit sequences 101 or 01001, an out-of-frame alarm results. This condition will also result whenever a terminal reframe is in progress or during transmission failure.

The destuff switch 55 from a more specific standpoint is used to either load a seventh data bit into the converter 54 or maintain the previous bit in the seventh position of the converter. For example, when the destuff control line from control decoder 56 is high, a seven bit word has been received. This allows the B1 bit to enter the seventh position of the converter. When the destuff control line is low, a six bit word has been received. This allows the seventh position output of the converter to be fed back on a line 63 again to the seventh position in effect not changing the seventh bit. Also note that line 62 corresponding to the receive data and the eighth bit is always fed back.

Control of the foregoing is achieved by use of the variable divider 59 which is reponsive to the destuff control. The divided down resultant frequency is phase-locked to the channel counter clock—thus an elastic store is provided without the use of the cell load selector, cell reader selector or cell reader.

As discussed above, the frequency control line 21' causes the removal of either one out-of-ten or one out-of-eleven pulses which are inputed into frequency selection unit 19'. This causes the average frequency output to be 1.4 megabits per second which when divided by 28 yields the 50KBS receive clock on line 60 as illustrated in FIG. 9. FIG. 10 illustrates the waveform on the frequency control line 21' which controls the frequency selection unit 19'; one out of eleven (1/11) is selected when this control line is high and one out of ten (1/10) when it is low as illustrated. Referring now specifically to the divide by 6 or 7 counter/decoder 59 this circuit divides the 50 KBS receive clock on line 60 by either 6 or 7 depending on the destuff control line.

Specifically 50KBS enters the clock input of integrated circuit 91 which is a three bit ripple counter having the outputs QB, QC, QD which correspond to binary weighted 1, 2 and 4 outputs. The counter includes reset inputs RO$_1$ and RO$_2$. If the destuff control input is low, the inverter 92 enables NAND gate 93 which resets the counter 91 at the 6 count. This is illustrated by the first two waveforms of FIG. 10 where there is no 6 count. However, if the destuff control is high, converter 92 disables NAND gate 93 to allow the counter 91 to count to 7. At this time NAND gate 94 detects the 7 count since all three outputs, QB, QC and QD of the counter 91 are high and this will reset the counter.

D-type flip-flop 96 uses the inverted 8 KBS output from QD through inverter 97 as a clock to generate a positive going parallel load command to line 61 of FIG. 5. This is a positive going pulse between channel counters to load the data into the parallel to serial converter of FIG. 5. A 100 KBS clock, not shown, is used to clear or reset flip-flop 96. NAND gate 98 combines a 6 count from counter 91 with the 50 KBS input to give a negative pulse 10 microseconds wide once every 125 microseconds which is used as the control decoder counter clock which of course is equivalent to a framing clock of 8 KBS.

Phase comparator 58 compares the 8 KBS average output of counter 91 with the receive channel counter clock; that is, the three outputs of counter 91 inputed into NAND gate 101—and of course the results of this comparison are illustrated in FIG. 10. The combination of the inverter 102, and NAND gates 101 and 103 cause the first four bits as shown in FIG. 10 to always be high and a fifth to be always low. The seventh bit is always high if there is a destuff signal. During the sixth bit the phase comparison is made by the D-type flip-flop 104 between its clock input which is the receive channel counter and its D input, which is the QD output of ripple counter 91. The output of the D flip-flop 104 drives NAND gate 103. During the sixth bit time the direction of the frequency is pushed such that the QD output of counter 91 is always trying to line up with the receive channel counter. For example, if the QD output of counter 91 is higher in frequency than the channel counter (8 KBS) the frequency control line 21' tends to drive the frequency select circuit lower in frequency.

The control decoder 56 is illustrated in greater detail in FIG. 6. In general it transforms information from the B2 bit into a form the receive side can use to control frequency and determine if a six bit or seven bit word is being received.

In normal operation this decoding logic will correct single errors in either the three code or the five code and will still remain in frame. Referring to FIG. 7, this is illustrated where, for example, in the case of the three code of 101 the codes of 001, 111, and 100, will also be recognized as legitimate three codes. In the case of the five code of 01001 any one of the bits can be in error, as shown, and the receive side will remain in frame. Thus, it is apparent that the first three bits of the five code compared to the first three bits of the three code have a Hamming distance of three in order to correct a single error. In other words, a single error in the three code will not cause it to look like the first three bits in the five code (even with one error).

However, if five frames occur and no five code with one error or less is received, then the receive side is out of frame (OOF). When the receive side is OOF the algorithm is changed. It will stay out until it gets an exact three code (101 with no errors) or a five code with one error or less. When it is OOF, it will put out a data bit on B1 every fifth frame. After five frames without an acceptable five code, the receive logic will start counting again and look for a three code. This algorithm will permit the receive side to get in frame in a maximum of 6 ms with one control bit in error or 3 ms with no bits in error. It also permits no loss of Bit Count Integrity for single or double errors in a control sequence. However, for double errors, it may cause a sequence of data errors as much as 26 bits.

Referring now to FIG. 6, information concerning the number of bits being sent is received on the B2 bit line in serial form. This enters a four bit shift register 63. The register in addition to the B2 input is also clocked by the receive channel counter. The four bit shift register 63 has four outputs QA through QD. The combinational integrated circuit logic 64A-E, 66A-E, 67A-E, and 68A-E monitors the B2 input and all the outputs of register 63. They decode the three code or the five code and their outputs appear at NOR gate 67E as $\overline{3CD}$ and the NAND gate 69 as 5CD. For example, if the last three received B2 bits are 101 (with one error or less) then $\overline{3CD}$ is low. Similarly, if the last five B2 bits are 01001 (with one error or less), the 5CD output is high. The above combinational logic also includes the NAND gate 71 which drives one input to NAND gate 69. At this point B2, QA-QD, are inverted and reversed; i.e., B2, QA, QD and 010 (for the three code) and B2, QA—QD will produce 01101 for the five code.

When the system is in frame the three code, $\overline{3CD}$ will be detected when a three count ($\overline{3CT}$) occurs. This occurs at the NOR gate 72 which has those two inputs. Three CT is generated by means of a three bit ripple counter 73 which has one, two and four weighted binary outputs. The one and two outputs are ANDed together by a NAND gate 74 to give a three count ($\overline{3CT}$) indication. Similarly, a five count (5CT) indication, that is the last bit or the fifth bit of the five code is produced by means of a NAND gate 76 and an inverter 79 which is coupled to the binary weighted one and four output lines of the counter 73. Counter 73 is reset through a NOR gate 77 which has as one input the receive channel counter pulse train and as the other input either the output of NOR gate 72 through NOR gate 78 or the output of NAND gate 76 which is inverted by inverter 79.

The output of NOR gate 72 goes high when a 3CD occurs at the three count of register 73; i.e., the system is in synchronization. This causes the output of a NOR gate 81 to go low which in turn causes the output of NAND gate 82 to go high which activates the destuff control line (see FIG. 5) and the destuff switch 55 to route the B1 bit in a manner similar to the rest of the data bits; i.e., it allows an incoming B1 to be a data bit. The same procedure occurs when 5CT and 5CD coincide at NAND gate 83 causing the output of the NAND gate to go low causing in turn the output of NOR gate 81 to go low and thus the destuff control line to go high to allow the B1 data bit through. Whenever 3CD and 3CT coincide or 5CT is reached the gate 78 output goes low and the receive channel counter input will reset the counter 73. Thus, if there is a 3CD input when there is a 3CT the counter will reset and look for 3CD again. If there is none, it goes to 5CT and then resets whether or not there is a 5CD.

When the system is out-of-frame the out-of-frame indication occurs at the output of NAND gate 84. This is coupled, referring to FIG. 5, to the alarm combiner unit 53. This in turn inhibits AND gate 67D; similarly the output of NAND gate 86 goes high forcing gate 66B low which in turn inhibits gates 67A and B. The effect of this is to allow only the exact three code to appear on the $\overline{3CD}$ line.

Whenever 5CT is reached without a 5CD (meaning that the proper 01001 code has not been detected with one error or less) the output of NAND gate 87 is low which causes the out-of-frame line to go low. While in the out-of-frame condition for a significant amount of time the receive clock will not be in synchronization with the transmit clock and the data will not be usable. An alarm will, of course, be put out by the alarm combiner unit 53 of FIG. 5.

The tolerance of the present invention to one error has already been explained but is apparent from examination of the logic of FIG. 6. For example, AND gates 67E will indicate the presence of a three code if any two inputs are true. In the case of two errors the system will still maintain synchronization and not lose bit count integrity. The system which normally will lose synchronization with 3 frame in error. FIG. 8A indicates the 101 three code and 01001 five code appearing in sequence; FIG. 8B the associated number of data bits in that particular channel word. In FIG. 8C where the two Xs are marked the first two bits of the three code form a double error. FIG. 8D illustrates that because of the double error the initial three code appears with its 011 to be the beginning of a five code (see FIG. 7) and thus in the fifth time slot a seven bit data word occurs. Thereafter the 001 appears to be a single error three code and the system is again in synchronization. With this type of double error there are 13 total bits which would be erroneous. However, bit count integrity is maintained; i.e., no bits have been lost or gained.

Similarly, FIGS. 8E through G indicate two errors occuring in a five code. As illustrated in FIG. 8H in the five code because of the double error the first three bits appear to be a three code and thus in the third time slot seven data bits occur. In the next two time slots there are several bits in error. However, at the beginning of the second five code the first digit 0 acts as the third bit of an 01001 code which indicates the beginning of a five code and thus in the third time slot of the second five code seven data bits will occur. However, the last two bits of this putative five code (01010) are in error and therefore the algorithm discussed above will cause the system to be out of frame until the next five bits are detected as a five code with one error. Then the system will be back in frame with no loss or gain of bits.

Similar actions occur with different permutations so that with double errors no more than 26 bit errors occur. This great immunity to even double errors is believed to occur because of the Hamming distance of three between the two codes 101 and 010, which identifies the five code, and also the type and different length of the five code as opposed to the three code. Also in view of the transmit logic maintaining a frequency very close to 50 KBS, no more than two 3 codes or two 5 codes can occur in sequence. The relatively simple circuit of FIG. 6 which detects the foregoing is believed to be a straight forward way of accomplishing noise immunity as opposed to the predictive techniques or complicated frame techniques of the prior art.

What is claimed is:

1. A time division transmission system for an asynchronous pulse train having means for converting the pulse repetition rate (PRR) of said pulse train to a higher PRR, by the insertion of stuff pulses, so that the resultant pulse train has a PRR which is synchronous with a predetermined and fixed frequency of a common, time-divided transmission facility, said resultant pulse train having a channel word with data bits and a control bit a predetermined plurality of said channel words constituting a frame, said system comprising means for inserting stuff pulses in said pulse train in one of said channel words in accordance with a sequential control bit code having sequences of long and short lengths where said long length provides a lower stuffing rate corresponding to a PRR less than said PRR of said asynchronous pulse train and said short length provides higher stuffing rate corresponding to a PRR greater than such pulse train, said system including receiving means responsive to said control bit code for removing said stuff pulses from said resultant pulse train.

2. A system as in claim 1 where said receiving means includes variable divider means responsive to said control bit code for dividing said predetermined and fixed frequency in accordance with the data bit indication of said control bit code.

3. A system as in claim 1 where said long length is 01001 and said short length is 101.

4. A system as in claim 1 where the last bit of each length indiciates a data bit occurs in that channel word in a predetermined time slot and the channel word corresponding to the other bits of said code each include a stuff bit in said time slot.

5. A system as in claim 1 where said receiving means is responsive to said control bit code for sensing an out of frame condition.

6. A system as in claim 1 including means for generating a pulse train having a PRR substantially identical to said asynchronous train including means for selectively removing pulses from a pulse train of said fixed frequency to provide such identical pulse train.

7. A time division transmission system for an asynchronous pulse train having means for converting the pulse repetition rate (PRR) to a higher PRR by the insertion of stuff pulses in a channel word of said time division system to a predetermined plurality of said channel words constituting a frame of said system comprising transmission means for inserting stuff pulses in said pulse train in one of said channel words and for inserting control bits in the same word, and means for receiving said pulse train and decoding a sequence of said control bits for framing said one channel and for detecting and removing said stuff pulses said decoding means sensing control bit sequences of two different lengths the long length corresponding to a low stuffing rate and the shorter length a higher stuffing rate.

8. A time division transmission system for an asynchronous pulse train having means for converting the pulse repetition rate (PRR) to a higher PRR by the insertion of stuff pulses in a channel word of said time division system to a predetermined plurality of said channel words constituting a frame of said system comprising transmission means for inserting stuff pulses in said pulse train in one of said channel words and for inserting control bits in the same word, and means for receiving said pulse train and decoding a sequence of said control bits for framing said one channel and for detecting and removing said stuff pulses said receiving means including a phase locked loop having variable frequency selection means connected to a fixed frequency of said system, a variable counter driven by a decoded sequence of said control bits said decode sequence indicating the total number of data bits per frame, and frequency control means coupled from said variable counter to said frequency selection means.

9. A time division transmission system for an asynchronous pulse train having means for converting the pulse repetition rate (PRR) of said pulse train to a higher PRR by the insertion of stuff pulses in a channel word of said time division system, a predetermined plurality of said channel words constituting a frame, said system having a channel counter clock frequency said system comprising: transmission means for inserting stuff pulses in said pulse train in one of said channel words and for providing on said pulse train destuffing instructions; means for receiving said pulse train and sensing said destuffing instructions including elastic storage means having parallel inputs for accepting a variable number of data bits of a channel word in accordance with said destuffing instructions and a serial output for providing said PRR of said asynchronous pulse train said storage means also including a parallel load-in control input for initiating parallel transfer of bits into said storage means and a serial shift-out control input, said receiving means also including phase locked loop means locked to said channel counter clock frequency and connected to a fixed frequency of said system to provide said PRR of said asynchronous pulse train to serve as said serial shift-out control signal, said loop also including a variable divider driven by said sensed destuffing instructions and having an output serving as said parallel load-in control input.

10. A system as in claim 9 where said receiving means includes a parallel input load register directly responsive to said channel counter clock frequency for receiving all bits in a channel word and having a parallel output connected to said elastic storage means.

* * * * *